United States Patent
Mergenthaler

(10) Patent No.: US 6,367,894 B1
(45) Date of Patent: Apr. 9, 2002

(54) METHOD AND DEVICE FOR SETTING THE BRAKING ACTION ON THE WHEELS OF A MOTOR VEHICLE

(75) Inventor: Rolf-Hermann Mergenthaler, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/643,055

(22) Filed: Aug. 21, 2000

(30) Foreign Application Priority Data

Aug. 24, 1999 (DE) .......................... 199 39 995
Nov. 18, 1999 (DE) .......................... 199 55 512

(51) Int. Cl.$^7$ .................................. B60T 8/32
(52) U.S. Cl. ........................ 303/192; 303/196
(58) Field of Search ................... 303/191, 192, 303/195, 196, 139, 140, 143

(56) References Cited

U.S. PATENT DOCUMENTS

| | | | | |
|---|---|---|---|---|
| 3,717,384 A | * | 2/1973 | Harned | 303/21 |
| 3,752,251 A | * | 8/1973 | Gaeke | 180/104 |
| 4,779,447 A | * | 10/1988 | Rath | 73/9 |
| 5,043,896 A | * | 8/1991 | Sol | 364/426.02 |
| 5,148,368 A | * | 9/1992 | Okubo | 364/426.02 |
| 5,215,358 A | * | 6/1993 | Beilfuss et al. | 303/114.3 |
| 5,351,540 A | * | 10/1994 | Gee | 73/509 |
| 5,474,368 A | * | 12/1995 | Sano | 303/163 |
| 5,765,929 A | * | 6/1998 | Hirano et al. | 303/112 |
| 5,957,552 A | * | 9/1999 | Clussen et al. | 303/192 |
| 6,099,090 A | * | 8/2000 | Paggi | 303/155 |
| 6,189,987 B1 | * | 2/2001 | Shimizu | 303/194 |
| 6,233,514 B1 | * | 5/2001 | Claussen et al. | 701/93 |

FOREIGN PATENT DOCUMENTS

| | | |
|---|---|---|
| EP | 495 796 | 6/1994 |
| WO | 90/06870 | 6/1990 |
| WO | 91/04892 | 4/1991 |

OTHER PUBLICATIONS

"FDR—die Fahrdynamikregelung von Bosch"[Driving Dynamics Control by Bosch], ATZ Automobiltechnische Zeitschrift 96 (1994), pp. 674–688.*

* cited by examiner

Primary Examiner—Christopher P. Schwartz
Assistant Examiner—Benjamin A Pezzlo
(74) Attorney, Agent, or Firm—Kenyon & Kenyon

(57) ABSTRACT

A method and a device for setting the braking action on the wheels of a motor vehicle is described where at least two wheels are arranged on a rear axle and two wheels are arranged on the front axle. A wheel quantity representing the stability of one wheel is formed at least as a function of the wheel slip. This wheel quantity (as a first comparison quantity) is compared with an appropriate threshold value (as a second comparison quantity). Depending on the result of this comparison, the braking action is set. A friction quantity representing the friction coefficient on one wheel or on several wheels of the rear axle is determined. Depending on this friction quantity describing the friction conditions on the rear wheels, at least one of the comparison values (friction value and/or threshold value) on one wheel or several wheels of the front axle is modified. This has the advantage that the determination of the friction coefficient on the rear wheels is not influenced by the modifications on the front axle wheels.

10 Claims, 4 Drawing Sheets

METHOD AND DEVICE FOR SETTING THE BRAKING ACTION ON THE WHEELS OF A MOTOR VEHICLE

FIELD OF THE INVENTION

The present invention relates to a method and device for setting the braking action on the wheels of a motor vehicle.

BACKGROUND INFORMATION

In conventional antilock control systems or driving stability control systems, such as those described in, for example, the article "FDR—die Fahrdynamikregelung von Bosch" [Driving dynamics control by Bosch], ATZ Automobiltechnische Zeitschrift 96 (1994), pp. 674–688, the braking effect on the vehicle wheels is set on the basis of the driving stability, independently of the driver. In antilock control systems this prevents the vehicle wheels from having an excessive slip, whereby the possibility of lateral forces being built up by the wheels is reduced. On roadways having a loose surface (gravel, rocks), however, the shortest braking distance can be achieved with the wheels locked, since in this case a certain chocking effect occurs. In addition, on such roadways and also on extremely poor stretches of road, very frequent and very extreme changes in wheel slip values occur. The vehicle wheels often seem to tend to lock since, due to the roadway unevenness, the wheels are caused to be considerably braked by the loose road surface. This results in an antilock control system causing too frequent or excessively strong braking pressure reductions on the average, which may result in an underbraked vehicle behavior.

Furthermore, on an uneven roadway, situations where the wheels are apparently unstable, and thus tending to lock, may occur for a short period of time even in the event of partial braking with a low braking pressure due to fluctuations in the wheel support forces, which, without additional measures, results in antilock control cycles being unnecessarily triggered. This results in reduced comfort, for example, due to pulsating brake pedal, and in unnecessary load on the antilock control system hydraulics, for example, due to switching of the brake pressure valves and activation of the recycling pump.

European Patent 495 796 B1 describes an antilock control system and an antislip control system which optimizes braking on uphill and downhill slopes. In order to determine the uphill or downhill roadway grade, the longitudinal vehicle acceleration is measured by acceleration sensors and compared with a longitudinal acceleration value determined from the rotational speed of the wheels. If an uphill or downhill grade is present, the antilock control system is made less sensitive, for example, by increasing the slip threshold or the deceleration threshold.

The antilock control system described in World Patent No. 90/06870, shows that the sensitivity of the control depends on vehicle deceleration, and the antilock control system, in particular the slip control system, is made less sensitive in response to the detection of controlled downhill.

One object of the present invention is to achieve optimum setting of braking action on roadways with a loose road surface (rocks, gravel or the like).

SUMMARY

The present invention relates to a method and to a device for setting the braking action on the wheels of a motor vehicle having at least two wheels arranged on a rear axle and two wheels on a front axle. A wheel quantity representing the stability of the wheel is formed at least as a function of the wheel slip. This wheel quantity (as a first comparison quantity) is compared with a corresponding threshold value (as a second comparison quantity). The braking action is set as a function of the result of this comparison.

A friction value which represents the friction coefficient on one wheel or on a plurality of wheels of the rear axle is determined. At least one of the comparison values (friction value and/or threshold value) on one wheel or on a plurality of wheels of the front axle is modified as a function of this friction coefficient which describes the friction conditions of the rear wheels. This has the advantage that the determination of the friction value on the rear wheels is not influenced by modifications of the front axle wheels.

In an advantageous embodiment of the present invention, a grade value is determined which represents the longitudinal grade of the roadway in the direction of travel on which the vehicle travels (uphill or downhill grade). Depending on this grade value, at least one of the comparison values is then modified on at least one wheel of the front axle. In this embodiment of the present invention, the control on the front axle is effected as a function of the roadway grade via the friction coefficient. In particular, in the event that a downhill grade of the roadway is detected off road, the comparison values (slip and/or slip threshold value) are subject to a particularly high degree of modification. This makes it possible to lock one or both front wheels, which, in the case of a loose roadway surface, results in drastic improvement in the braking action.

In an example embodiment of the present invention, the wheel rotational speed quantities, which represent the rotational movement of the wheels, are detected. A longitudinal acceleration value representing the actual vehicle acceleration is determined from these rotational speed quantities. Furthermore, an estimated value of the longitudinal acceleration of the vehicle is determined at least as a function of quantities representing the braking and/or driving action on the wheels. Such quantities are understood in particular as the admission pressure determined by the actuation of the brake pedal by the driver, the brake pressure valves' opening times, or the output torque acting as the driving torque on the wheels. According to this embodiment of the present invention, the grade value is determined as a function of the longitudinal acceleration value and the estimated value. This is done by comparing the actual longitudinal acceleration value and the estimated value. The grade value is determined according to the present invention, contrary to European Patent 495 796 B1 mentioned above, without an additional acceleration sensor.

In another example embodiment of the present invention, at least one longitudinal force value representing the longitudinal force acting on at least one wheel is determined. In addition, a normal force value representing the normal force acting on at least one wheel is determined. Normal force is understood as the force acting perpendicularly to the roadway between the wheel, i.e., the tires, and the roadway. In this embodiment of the present invention, the friction value is determined as a function of the longitudinal force value and the normal force value.

In an example embodiment of the present invention, a steering quantity representing the steering angle of the vehicle is determined. This can be, for example, the steering angle of the steering wheel actuatable by the driver. Then, according to the present invention, at least one of the comparison quantities on at least one wheel of the front axle is modified as a function of the steering quantity. In particular, if a steering intention of the driver is detected, in order to preserve steerability, the modification according to the present invention is not implemented or the modification according to the present invention is implemented to a slight degree compared to the case where no steering intention is detected.

When greater friction coefficients are present, which is detected in particular by the fact that a predefinable threshold value of the friction value is exceeded, the modification according to the present invention is implemented on both wheels of the front axle. If, however, only smaller friction coefficients are present, which is detected by the fact that the friction value is less than a predefinable threshold value, the modification according to the present invention is only implemented on a single wheel of the front axle. When a very small friction coefficient is present, which is detected, in particular, by the fact that the friction value is below a predefinable very low threshold value, no modification is implemented on the front axle wheels according to the present invention.

When smaller friction coefficients are present, which is detected by the fact that the friction coefficient is below a predefinable threshold value, the modification according to the present invention can be implemented on a single wheel of the front axle so that the modification is performed alternatingly on the two wheels of the front axle.

The embodiments described in the two previous paragraphs have the advantage that the modification according to the present invention can be adapted very accurately to the prevailing friction conditions. If a higher friction value is detected, the modification is allowed on both front wheels, which results in increased tendency of both front wheels to lock.

However if smaller friction coefficients are present, the modification according to the present invention is only implemented on one front wheel, which results in a shorter braking path, while sufficient steerability and stability are still guaranteed. Only in cases of very low friction coefficients, for example on ice, is maintaining steerability a priority; therefore, in those situations, the modification according to the present invention is disabled and does not take place.

In another example embodiment of the present invention, a velocity value representing the vehicle's longitudinal velocity is determined. Such a velocity value is derived from the wheel rotational speed as a reference velocity. The modification according to the present invention is only implemented in the case of lower velocity values, which is detected, in particular, by the fact that the velocity value is less than a predefinable velocity threshold. This embodiment is based on the fact that in general relatively low longitudinal vehicle velocities occur when traveling off road, i.e., at sufficiently low longitudinal vehicle velocities, shortening the braking path has priority over steerability.

Furthermore, a roadway value representing the roadway unevenness can be determined. The determination of such a roadway value is described in detail in the literature as roadway unevenness recognition. The modification according to the present invention is effected as a function of the roadway value. This is accomplished by the modification (an increase in the tendency of the front wheels to lock), in the case of roadways having a high degree of unevenness, being more pronounced than in the case of roadways having a lower degree of unevenness.

In general, a transmission is arranged in the power train of the vehicle between the vehicle engine and the vehicle wheels. In off-road vehicles the transmission may have an off-road gear (low gear) selectable by the driver. The modification according to the present invention depends, in an advantageous embodiment of the present invention, on the selection of the low gear. This means that for vehicles having an off-road low gear setting, the fact that the low gear has been set is used as an additional criterion for carrying out the modification according to the present invention. Thus, for example, the modification according to the present invention (off-road measures) can be disabled in high gear. In addition, the above-mentioned threshold values for detecting an off-road situation can be configured differently in high and low gear.

DETAILED DESCRIPTION

Figure 1:
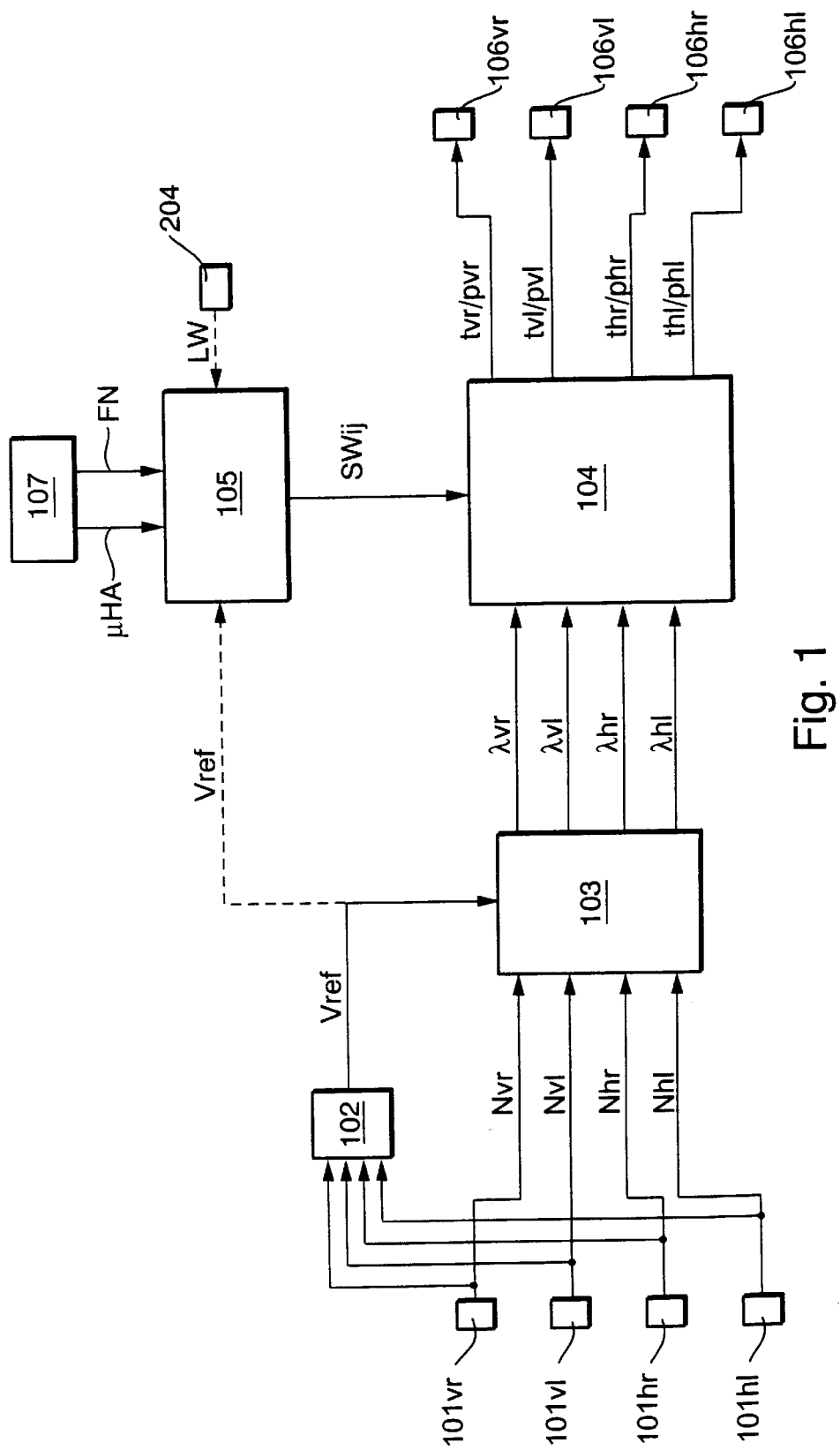
FIG. 1 shows a schematic block diagram of an example embodiment of the present invention.

In FIG. 1, 101vr, 101vl, 101hr, and 101hl denote wheel rotational speed sensors that detect wheel rotational velocities Nij. Index i denotes whether a wheel belongs to the front axle (v) or the rear axle (h). Index j shows whether the wheel in question is located on the right (r) or left (l) side of the vehicle.

Wheel rotation speeds Nij are sent to block 102, which determines vehicle reference velocity Vref in a conventional manner. Both reference vehicle velocity Vref and wheel rotation speeds Nij are sent to block 103, which forms the wheel slip values λij from these input quantities in a conventional manner; the wheel slip values here denote the wheel brake slip in particular.

$$\lambda ij = (Vref - Nij)/Vref$$

The actual antilock control is implemented by block 104. In this embodiment the antilock control system is implemented as a slip controller, which means that wheel slip values λij are set to certain setpoint values SWij. This is done by influencing wheel brakes 106ij either by providing direct brake pressure information pij, for example on a lower level brake pressure controller, or by opening or closing the brake pressure valves, by whose actuation during a predefinable period of time tij, the braking pressure can be increased, decreased or held constant.

As far as the previously described blocks are concerned, the system shown in FIG. 1 is a conventional antilock control system, which is designed as a slip controller. In the example embodiment of the present invention, however, slip threshold values SWij are modified in block 104. This is done by determining threshold values SWij in block 105 as a function of friction value $\mu_{HA}$ at the rear axle as a function of longitudinal roadway grade FN and longitudinal vehicle velocity Vref and/or steering wheel angle LW (steering wheel angle sensor 204). The friction value and the longitudinal grade of the roadway are determined in block 107.

Antilock controller 104 which, as mentioned before is designed as a slip controller, can of course also use other wheel dynamics quantities such as wheel deceleration or quantities derived from the wheel acceleration and the wheel slip as a basis for the control.

Figure 2:
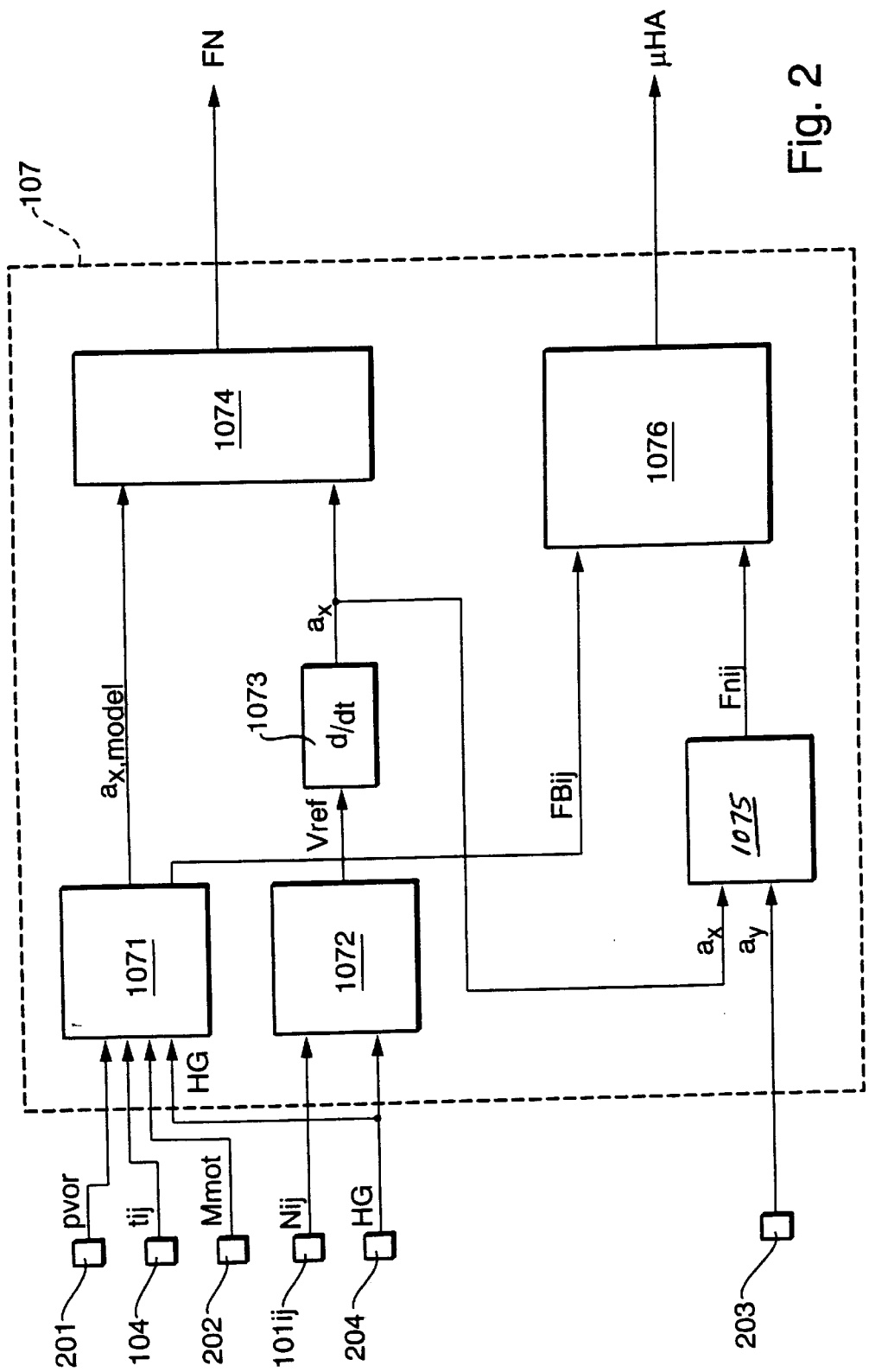
FIGS. 2 and 3 show detailed schematic block diagrams of portions of the example embodiment of the present invention.

FIG. 2 shows block 107 shown in FIG. 1 in more detail.

Admission pressure Pvor determined by pressure sensor 201, and engine output torque Mmot determined by engine controller 201 are supplied to admission pressure block 1071 shown in FIG. 2. In addition, activation times tij of brake pressure valves 106ij (FIG. 1) are supplied by block 104 (FIG. 1) to block 1071. Admission pressure Pvor, measured by pressure sensor 201, is in general set by the driver using the brake pedal. Solenoid valves are usually provided for increasing and decreasing brake pressure or to hold the brake pressure constant. The braking action on the vehicle wheel is controlled through opening times tij of the respective brake pressure valves. Engine output torque Mmot is an easily measurable quantity in today's engine management systems.

Furthermore, auxiliary quantities HG, which are either sensor-measured by block 204 or determined by calculation, are supplied to block 1071. Such auxiliary quantities are in general the steering wheel angle measured by a sensor, the yaw rate, and the transverse acceleration of the vehicle.

The brake pressure on the individual wheels is now estimated 10 in block 1071 as a function of the input quantities. The longitudinal forces acting on the wheels can be calculated from the estimated pressure values. Block 1071 will be described below in more detail with reference to FIG. 3.

Figure 3:
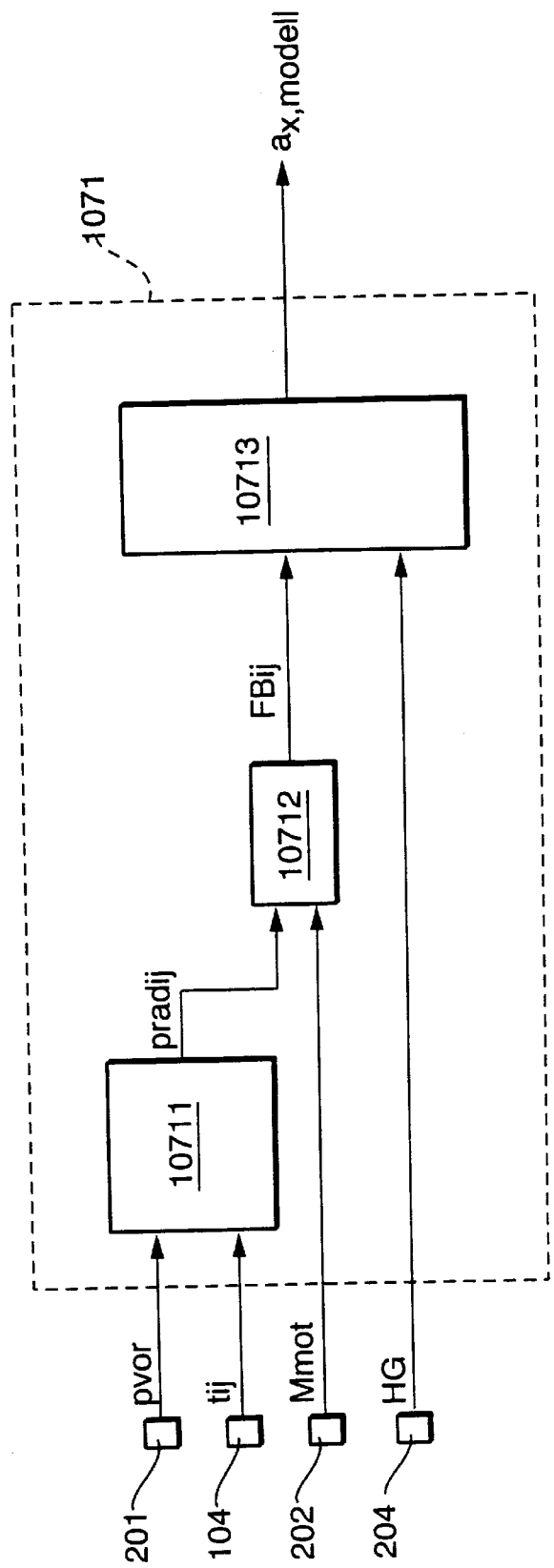

For this purpose, measured admission pressure Pvor and solenoid activation times tij are supplied to block 10711 shown in FIG. 3. Wheel brake pressure $P_{radij}$ on the individual wheels can be calculated or estimated in block 10711 from admission pressure Pvor and solenoid activating times tij. The individual wheel brake pressures are supplied to block 10712.

Vehicle-specific data such as the torque reduction between the vehicle engine and the wheels, the wheel radius, as well as braking values such as the braking forces as a function of the brake pressure, is stored in block 10712.

The braking and driving forces $F_{Bij}$ acting on the individual vehicle wheels are calculated from the wheel brake pressures and the engine output torque in block 10712. These braking and driving forces are supplied to block 10713. Additional vehicle data such as vehicle weight are stored in this block.

Furthermore, auxiliary quantities such as the steering wheel angle, the yaw rate, the transverse acceleration, and the reference velocity are supplied to block 10713. Thus, for example, the braking forces resulting from oblique travel can be estimated from the steering wheel angle, the yaw rate, and the transverse acceleration. The air resistance forces, for example, can be derived from the reference velocity representing the longitudinal vehicle velocity. An estimated longitudinal vehicle velocity ax,modell is at the output of block 10713. Depending upon the detected wheel rotation speeds Nij (wheel rotational speed sensors 101ij) and depending on the above-mentioned auxiliary quantities HG, vehicle reference velocity Vref can be determined in block 1072 of FIG. 2. In block 1073 reference velocity Vref representing the longitudinal vehicle velocity is differentiated, which results in longitudinal vehicle acceleration ax. In block 1074, the estimated longitudinal vehicle acceleration ax,modell is compared with the actual longitudinal vehicle acceleration ax.

Depending on the difference between these two quantities, longitudinal grade FN of the roadway can be estimated.

At the bottom of FIG. 2, in block 203, transverse vehicle acceleration ay is either directly measured by a sensor or calculated, for example from the differences in wheel rotation speeds between the right-side and left-side vehicle wheels.

Transverse vehicle acceleration ay is gated with the actual longitudinal vehicle acceleration ax (output signal of differentiating element 1073) in block 1075. For this purpose, vehicle-specific data are stored in block 1075, such as, for example, the vehicle weight, the position of the vehicle's center of gravity, the wheel gauge and, if necessary, other geometric vehicle data. In block 1075, wheel support forces Fnij for the vehicle wheels are calculated in a known manner (see for example the above-mentioned ATZ article) from the input data. The wheel support forces are the normal forces acting perpendicularly to the roadway. In block 1076, the friction coefficient uHA prevailing on the rear axle wheels is calculated as a function of wheel support forces Fnhj (output signal of block 1075) and wheel braking forces or driving forces $F_{bij}$ formed in block 1071 according to the equation $$\mu_{HA} = \frac{F_{Bhl} + F_{Bhr}}{Fnhl + Fnhr}$$

The lateral forces acting on the tires of the rear wheels are ignored here.

After appropriate filtering, signal $\mu_{HA}$, representing the friction coefficient on the rear axle wheels, is present at the output of block 1076 and thus at the output of block 107.

As mentioned above, the output signals of block 107 are supplied to block 105 of FIG. 1 which determines slip threshold values SWij as a function of these signals. This is illustrated below with the help of the sequence diagram of FIG. 3.

After initial step 401, steering wheel angle LW, longitudinal roadway grade FN, rear axle friction coefficient $\mu_{HA}$, and reference vehicle velocity Vref are input in step 402. In step 403, steering wheel angle LW is compared with threshold value SW1. If steering wheel angle LW exceeds threshold value SW1, this means that the driver intends to perform a considerable steering maneuver. In this case, final step 408 directly follows. However, if it is found in step 403 that steering wheel angle LW is less than threshold value SW1, comparison 404 follows. In comparison 404, longitudinal roadway grade FN is compared to a threshold value SW2. In addition, in step 404, reference velocity Vref is compared with threshold value SW3.

If longitudinal roadway grade FN does not exceed threshold value SW2, horizontal travel or uphill travel is taking place, whereupon end step 408 follows. End step 408 is also activated if the reference vehicle velocity is greater than a threshold value SW3.

However, if it is found in step 404 that the vehicle is traveling on a relatively steep downhill grade and the longitudinal vehicle velocity is not excessively high, step 405 follows.

In step 405, friction coefficient $\mu$HA on the rear axle is compared with threshold value SW4. If it is found in step 405 that the friction coefficient on the rear axle is relatively high, step 407 follows.

In step 407, slip threshold values SWvr and SWvl on both front axle wheels are set high. This means that the braking action is set so that the front wheels are allowed to be locked. The slip threshold value can also be selected as a function of the roadway unevenness. Such a roadway unevenness recognition is known from the related art. Furthermore, additionally or alternatively, the slip threshold values on the front axle can be selected as a function of longitudinal vehicle velocity Vref, with the slip threshold values being selected lower with increasing longitudinal vehicle velocity. As mentioned before, the slip threshold values in step 407 can also be selected as a function of the position of a low gear switch.

If the position of the low gear switch shows that the vehicle is traveling off road, the slip threshold values on the front axle are again set somewhat higher.

If it is found in step 405 that the friction coefficient on the rear axle is less than threshold value SW4, a query is performed in step 406 whether the friction coefficient on the rear axle is less than the lower threshold value SW5. The value 0.4 can be given as an example of threshold value SW4 and 0.2 as an example of threshold value Sw5.

If it is determined in step 406 that the friction coefficient is less than threshold value SW5, the vehicle is traveling on a very smooth roadway whereupon end step 408 follows. However if the friction coefficient on the rear axle is between threshold value SW5 and threshold value SW4, step 406 follows.

In step 406, a slip threshold value of a single wheel of the front axle is set high. This can also be done as a function of the roadway unevenness (roadway unevenness recognition). In step 406 either the slip threshold value of a certain front wheel can be set high or the slip threshold values of the front wheels are alternatingly set high.

According to the present invention, if a certain travel situation corresponding to an off-road situation is detected, the setpoint value of the slip controller (setpoint slip increase) is increased on one or both front wheels. No measures are taken with respect to the rear wheels for reasons of vehicle stability. Thus brake pressure reductions in the front wheels do not take place until higher wheel slip values occur, which means in the event of strongly fluctuating wheel slip values (uneven roadway), for example, fewer brake pressure reducing operations are performed on the average. The setpoint slip can be increased as a function of the roadway characteristics. This means that the more uneven the roadway, the greater the increase in the setpoint slip.

In addition to increasing the setpoint slip on the front wheels, for example, the control parameters of the slip controller, the amplification factors of the proportional part, the differential part, and/or the integral part can be reduced, so that, in this case as well, smaller brake pressure reduction results.

Furthermore, the start of brake pressure control can be modified. Thus, for example, control start filtering insures that no "unnecessary" antilock control is implemented as a result of very uneven roadways. Normally, anti-lock control starts on one wheel when wheel instability is recognized, for example, when the wheel slip exceeds a certain setpoint slip value. In the event of partial braking using low brake pressure (for this purpose admission pressure Pvor is measured) if wheel instability occurs on one wheel, control is only begun after a fixed waiting period, for example, 60 ms. It has been found that the apparent instabilities resulting from roadway unevenness usually do not last longer than 60 ms. An off-road situation can be recognized, for example, by signal analysis of the measured wheel velocities Nij. If high wheel velocity accelerations frequently occur, this is an indication of an uneven roadway, because strongly fluctuating wheel velocities are generated by constant fluctuations in the wheel support forces Fnij (constantly alternating load and no-load on the wheels). While considerable wheel (re)accelerations only occur when braking on an even roadway due to pressure reductions in the antilock system, off road they are also generated by the roadway conditions. This can be evaluated by a counting algorithm for off-road situation recognition.

An off-road counter value Zg is generated by increasing counter value Zg in the event of high acceleration on one wheel. In this case there are two threshold values for the wheel accelerations. If the wheel acceleration is greater than a threshold value 1 and less than a threshold value 2, then counter value Zg is increased by 4. If the wheel acceleration is greater than a threshold value 2 then counter value Zg is increased by 8.

If wheel acceleration is not present, counter value Zg is diminished, for example, by 1. The frequency of wheel accelerations can thus be determined.

There are, however, very uneven snow-covered roadways (for example, snow that has solidified in the form of a washboard) which also result in frequent wheel accelerations on which, however, no off-road measures according to the present invention should be taken for reasons of stability. Distinction is made between uneven snow-covered roadways and an off-road situation with the help of wheel signal analysis. Due to the considerably lower friction coefficient of a snow-covered roadway, the difference between vehicle velocity and wheel velocity is higher on the average during antilock control than in an off-road situation, when the wheel is unstable and brake pressure is subsequently reduced, it takes longer for the wheel to approach the vehicle velocity due to the lower friction coefficient on snow. By low-pass filtering the quantity $$V\text{ref}-N\text{hl}+V\text{ref}-N\text{hr},$$

a kind of "average difference between vehicle velocity and rear wheel velocities" is calculated. If the above-mentioned value is less than an appropriate first threshold value, the vehicle is traveling off road and counter Zg is formed as described above. However, if the above-described value is greater than an appropriate threshold value 2, the vehicle is traveling on a roadway having a very low friction coefficient; therefore counter Zg is reduced. If, however, the above-mentioned value is between threshold values 1 and 2, the situation is not unambiguously clear and all increases of counter Zg are halved. Counter Zg is limited to a range between 0 and 60. If the counter is greater than a threshold value of 40, the off-road measure can be undertaken first if other additional conditions, to be described later, are met.

A first condition is that the vehicle deceleration should not be too high, otherwise no unambiguous off-road situation is present, but rather braking on the roadway having a high friction coefficient.

Figure 4:
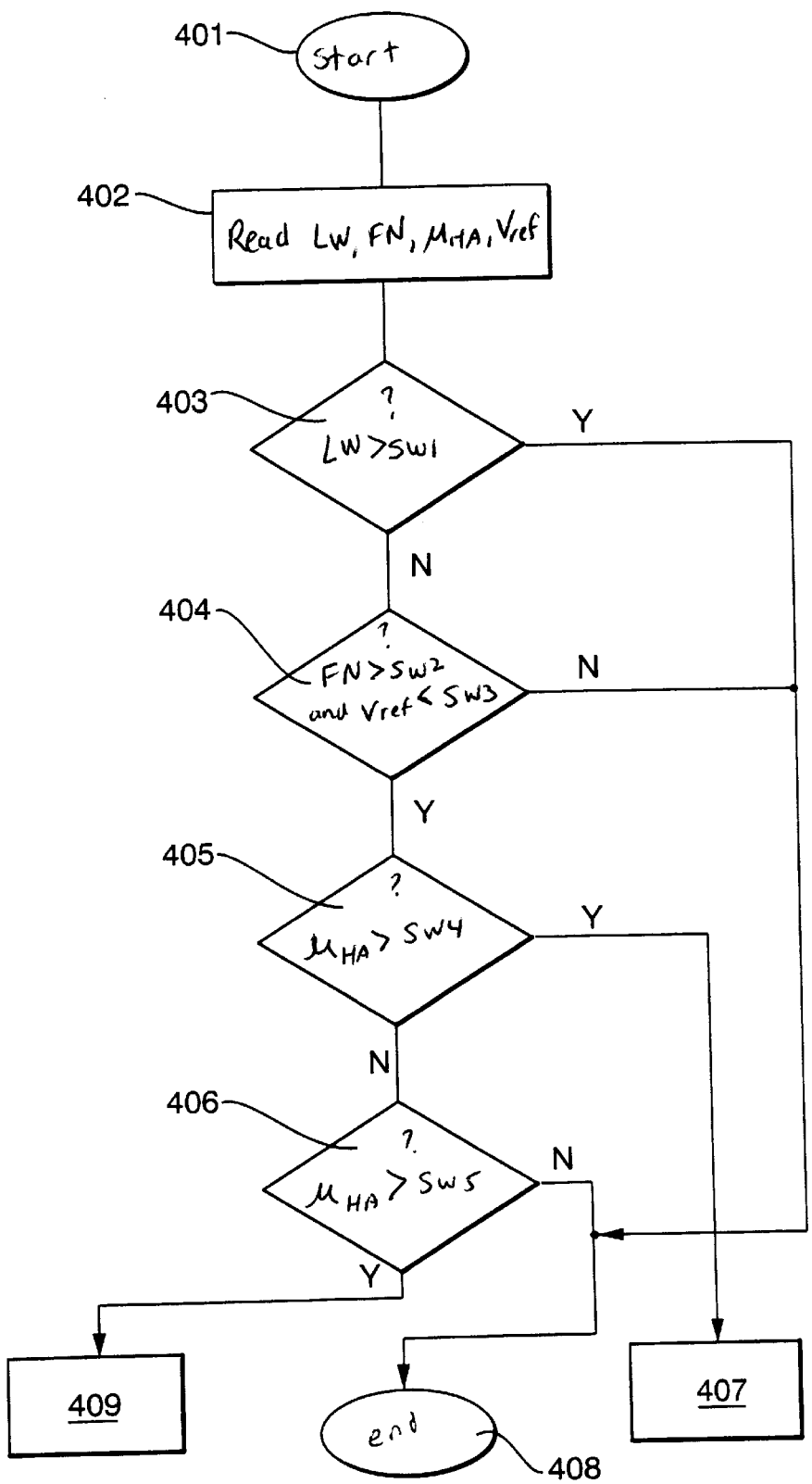
FIG. 4 shows a sequence diagram.

As can be seen in step 403 of FIG. 4, no unambiguous steering intention of the driver should be present (steering angle LW must be less than a travel velocity-dependent threshold SW1). If any intention to steer is present, no off-road measures are taken for reasons of steerability.

As mentioned above, steep downhill travel is recognized from the difference between the actual vehicle acceleration ax and an estimated vehicle acceleration ax,modell. A considerable difference between the decelerations indicates steep downhill travel. The modification according to the present invention for steep downhill travel should only be implemented if both the longitudinal vehicle velocity and the longitudinal vehicle deceleration are low (step 404 in FIG. 4).

In summary, without the special measures according to the present invention in the antilock controller, in the event of locking braking off road, underbraking situations may occur. Therefore considerably more braking slip is allowed on the front wheels off road in order to make sufficient braking performance possible. When steep downhill travel is recognized, the front wheels are allowed to be locked, since the driver otherwise feels that the vehicle is underbraked during downhill travel. These measures have a negative effect on vehicle steerability and vehicle stability on transversely sloping roadways, in particular on snow-and ice-covered roadways. Without the special measures according to the present invention, in the event of partial braking off road, antilock control is triggered because of fluctuations of the wheel loads, resulting in driver discomfort (pulsating brake pedal). Such unnecessary controls are suppressed by control start filtering.

What is claimed is:

1. A method of setting a braking action on wheels of a motor vehicle having at least two wheels on a rear axle and two wheels on a front axle, comprising:

forming a wheel quantity representing a stability of a wheel as a function of a wheel slip;

comparing the wheel quantity with a threshold value;

setting a braking action as a function of the comparing step;

determining a friction value representing a friction coefficient on at least one of wheels of the rear axle; and modifying at least one of: i) the wheel quantity, and ii) the threshold value, on at least one wheel of the front axle as a function of the determined friction value.

2. The method according to claim 1, further comprising:

determining a grade value that represents a longitudinal grade of a roadway traveled by the motor vehicle; and modifying at least one of: i) the wheel quantity, and ii) the threshold value, as a function of the determined grade value.

3. The method according to claim 2, further comprising:

detecting a rotational speed quantity representing a rotational motion of the wheels;

determining a longitudinal acceleration value representing an actual longitudinal vehicle acceleration as a function of the rotational speed quantity;

determining an estimated value that represents at least one of: i) braking, and ii) driving forces, acting on the wheels as a function of at least one of: i) an admission pressure, ii) an activation time of brake pressure valves, and iii) engine output torque for the longitudinal acceleration value; and determining the grade value as a function of the longitudinal acceleration value and the estimated value.

4. The method according to claim 1, further comprising:

determining at least one longitudinal force value representing a longitudinal force acting on at least one wheel;

determining at least one normal force value representing a normal force acting on at least one wheel; and determining the friction value as a function of the longitudinal force value and the normal force value.

5. The method according to claim 1, further comprising:

determining a steering quantity representing a steering angle of the motor vehicle, and wherein the modification of the at least one of the wheel quantity and the threshold value on the at least one wheel of the front axle is also a function of the steering quantity.

6. The method according to claim 1, further comprising:

performing at least one of:

if a high friction value is detected, the modification of the at least one of the wheel quantity and the threshold value takes place on the two wheels of the front axle, the high friction value being detected when the friction value exceeds a first predefined threshold;

if a low friction value is detected, the modification of the at least one of the wheel quantity and the threshold value takes place on only one of the wheels of the front axle, the low friction value being detected is the friction value is less than a second predefined threshold;

if a lower friction value is detected, no modification of the at least one of the wheel quantity and the threshold value is effected on any of the wheels of the front axle, the lower friction value being detected when the friction value exceeds a third predefined threshold; and if the lower friction value is detected, the modification of the at least one of the wheel quantity and the threshold value takes place on only one wheel of the front axle alternating between the two wheels of the front axle, the lower friction value being detected when the friction value is less a fourth predefined threshold.

7. The method according to claim 1, further comprising:

determining a velocity value representing a longitudinal velocity of the vehicle; and effecting the modification of the at least one of the wheel quantity and the threshold value only at a lower velocity value, the lower velocity value being detected when the velocity value is lower than a predefined threshold value.

8. The method according to claim 1, further comprising:

determining a roadway value representing an unevenness of the roadway, wherein modification of the at least one of the wheel quantity and the threshold value is effected as a function of the roadway value.

9. The method according to claim 1, wherein the vehicle includes a transmission arranged between an engine of the vehicle and the wheels of the vehicle, the transmission having a selectable transmission ratio, modification of the at least one of the wheel quantity and the threshold value depending of a selected transmission ration.

10. A device for setting a braking action on the wheels of a motor vehicle having at least two wheels on a rear axle and two wheels on a front axle, comprising:

a first arrangement forming a wheel quantity representing a stability of a wheel as a function of a wheel slip;

a second arrangement comparing the wheel quantity with a threshold value;

a third arrangement setting a braking action as a function of the comparing by the second arrangement;

a fourth arrangement determining a friction value representing a friction coefficient on at least one of wheels of the rear axle; and a fifth arrangement modifying at least one of: i) the wheel quantity, and ii) the threshold value, on at least one wheel of the front axle as a function of the determined friction value.

* * * * *